US008035752B2

(12) United States Patent
Castle et al.

(10) Patent No.: US 8,035,752 B2
(45) Date of Patent: Oct. 11, 2011

(54) EVENT PRODUCTION KIT

(75) Inventors: Gordon Castle, Atlanta, GA (US);
Kevin Lee Hammond, Alpharetta, GA (US); Yonatan Amezene, Snellville, GA (US); Jeffrey Lynn Hall, Marietta, GA (US); Mathew J. Hathaway, Dacula, GA (US); Kevin James Garguilo, Duluth, GA (US); Jared Matthew Timmins, Adairsville, GA (US); David Lee Stevens, Atlanta, GA (US); David P. Deason, Tyrone, GA (US); Unni Vellanikaran, Atlanta, GA (US)

(73) Assignee: 2080 Media, Inc., Atlanta, GA (US)

( * ) Notice: Subject to any disclaimer, the term of this patent is extended or adjusted under 35 U.S.C. 154(b) by 1012 days.

(21) Appl. No.: 11/851,231

(22) Filed: Sep. 6, 2007

(65) Prior Publication Data
US 2009/0066846 A1    Mar. 12, 2009

(51) Int. Cl.
*H04N 5/222*    (2006.01)
(52) U.S. Cl. .......................................... 348/722; 348/75
(58) Field of Classification Search .................. 348/722, 348/552, 836, 705, 706, 838–840; 434/362; 715/716–726; 386/223, 230, 358, 359, 362; *H04N 5/222, 5/268, 5/64*
See application file for complete search history.

(56) References Cited

U.S. PATENT DOCUMENTS

| | | | |
|---|---|---|---|
| 3,575,552 A * | 4/1971 | Grant et al. | ................... 386/223 |
| 5,307,456 A | 4/1994 | MacKay | |
| D347,113 S | 5/1994 | Bornhorst et al. | |
| 5,454,477 A | 10/1995 | Bornhorst et al. | |
| 6,339,531 B1 | 1/2002 | McKain et al. | |
| 6,353,461 B1 | 3/2002 | Shore et al. | |
| 6,452,612 B1 | 9/2002 | Holtz et al. | |
| 6,952,221 B1 | 10/2005 | Holtz et al. | |
| 6,977,673 B1 | 12/2005 | McKain et al. | |
| 7,006,154 B2 | 2/2006 | Dudkowski | |
| 7,024,677 B1 | 4/2006 | Snyder et al. | |
| 7,340,765 B2 | 3/2008 | Feldmeier | |
| 2002/0031756 A1 * | 3/2002 | Holtz et al. | ................... 434/362 |
| 2002/0109710 A1 | 8/2002 | Holtz et al. | |
| 2002/0124260 A1 | 9/2002 | Rivera | |
| 2002/0175931 A1 | 11/2002 | Holtz et al. | |

(Continued)

FOREIGN PATENT DOCUMENTS

JP    06156558 A    6/1994

(Continued)

*Primary Examiner* — Sherrie Hsia
(74) *Attorney, Agent, or Firm* — Nelson Mullins Riley & Scarborough, LLP

(57) ABSTRACT

According to various embodiments, an event production kit is provided that includes storage cases for storing production equipment, such as cameras, monitors, and microphones, and an electronic production equipment case for storing an audio mixer, a video switcher, and computers for encoding and distributing the production. In addition, in one embodiment, the electronic production equipment case includes a vertical panel that includes a plurality of ports that are pre-wired to the audio mixer, video switcher, and the computers for coupling the production equipment together. The storage cases and the pre-wired panel facilitate transporting the kit to the event location and reduce the amount of time and resources required for setting up the equipment prior to the event, according to various embodiments. In addition, the selection of the type of equipment included in the kit, according to one embodiment, provides for a high quality, lower cost production than is currently available.

24 Claims, 16 Drawing Sheets

U.S. PATENT DOCUMENTS

| | | |
|---|---|---|
| 2002/0186233 A1 | 12/2002 | Holtz et al. |
| 2002/0196329 A1 | 12/2002 | Dudkowski |
| 2002/0199198 A1 | 12/2002 | Stonedahl |
| 2003/0001880 A1 | 1/2003 | Holtz et al. |
| 2003/0214605 A1 | 11/2003 | Snyder et al. |
| 2004/0008220 A1 | 1/2004 | Snyder et al. |
| 2004/0027368 A1 | 2/2004 | Snyder et al. |
| 2004/0070690 A1 | 4/2004 | Holtz et al. |
| 2004/0117427 A1 | 6/2004 | Allen et al. |
| 2004/0210945 A1 | 10/2004 | Snyder et al. |
| 2005/0052527 A1 | 3/2005 | Remy et al. |
| 2005/0076387 A1 | 4/2005 | Feldmeier |
| 2006/0023117 A1 | 2/2006 | Feldmeier |

FOREIGN PATENT DOCUMENTS

| | | |
|---|---|---|
| WO | WO 00/60852 | 10/2000 |
| WO | WO 02/10963 A2 | 2/2002 |
| WO | WO 02/10969 A2 | 2/2002 |

\* cited by examiner

EVENT PRODUCTION KIT

BACKGROUND OF THE INVENTION

Production equipment, such as cameras, microphones, video switchers, audio mixers, and computers running encoding software, is typically expensive and requires a substantial amount of space to transport it to the location of the event being produced. Production of live events typically requires expensive production trucks or expensive video and audio production control rooms. In addition, the production teams are required to spend a considerable amount of time, often several days or weeks, coordinating equipment/truck/facility rentals usage, staffing, and distribution arrangements or broadcast partnerships.

Accordingly, there is a need in the art for an event production kit that provides an ergonomic equipment configuration and facilitates the production of events in a time-effective/cost-effective manner.

BRIEF SUMMARY OF VARIOUS EMBODIMENTS OF THE INVENTION

Various embodiments of the invention provide a production kit that has component parts capable of being assembled at a production site. In particular, the kit includes: (1) a first case capable of storing equipment used in recording and producing an event, wherein the equipment includes: (a) one or more video cameras and (b) two or more audio communication transceivers for allowing two or more members of a production team to communicate with each other remotely; (2) a second case capable of storing equipment used in recording and producing an event, wherein the equipment includes: (a) two or more monitors, (b) at least one keyboard, and (c) one or more microphones; and (3) a third case capable of storing equipment used in recording and producing an event, wherein the equipment includes: (a) a video switcher capable of receiving video input from each of the one or more video cameras and allowing a video director to select a video input from one of the one or more video cameras as a video program output, (b) an audio mixer capable of receiving audio input from each of the one or more microphones and allowing an audio director to select a level at which each audio input is to be output as an audio program output, (c) one or more encoder computers capable of encoding a program output and transmitting the program over a network, wherein the program output includes the video program output and the audio program output, (d) a vertical panel secured adjacent a back side of the third case that includes a plurality of ports for receiving connectors from cables attached to each of the one or more cameras, the two or more monitors, the at least one keyboard, and the one or more microphones, and (e) a slidable horizontal shelf supporting the audio mixer and being movable from below a perimeter of a top side of the third case to at least partially outside a the perimeter. Each of the ports configured for receiving connectors from cables attached to each of the one or more cameras and each of the two or more monitors is pre-wired to the video switcher, and each of the ports configured for receiving connectors from cables attached to each of the one or more microphones is pre-wired to the audio mixer. In addition, the video switcher, the audio switcher, and each of the ports configured for receiving connectors from cables attached to the at least one keyboard are pre-wired to the one or more encoder computers. The pre-wiring enables a user to set up the equipment without substantial assembly. In a particular embodiment, each of the first case, the second case, and the third case includes a set of wheels adjacent a bottom surface of each of the cases on which each case can roll along a support surface.

In addition, various embodiments of the invention provide a method of setting up production equipment stored in an event production kit. The method includes the steps of: (1) removing the at least one video camera, the at least two monitors, the at least one keyboard, and the at least one microphone from the first case and the second case; (2) coupling the at least one video camera, the at least two monitors, the at least one keyboard, and the at least one microphone to a respective port on the vertical panel of the third case with cables; and (3) providing power to a power supply disposed within the third case. Each respective port for receiving a signal from the at least one camera is pre-wired to the video switcher, each respective port for receiving a signal from each of the one or more microphones is pre-wired to the audio mixer, and an output of the video switcher and an output of the audio mixer are pre-wired to the one or more encoder computers. Pre-wiring enables a user to set up the equipment without substantial assembly according to various embodiments of the invention.

BRIEF DESCRIPTION OF THE DRAWINGS

Figure 1:
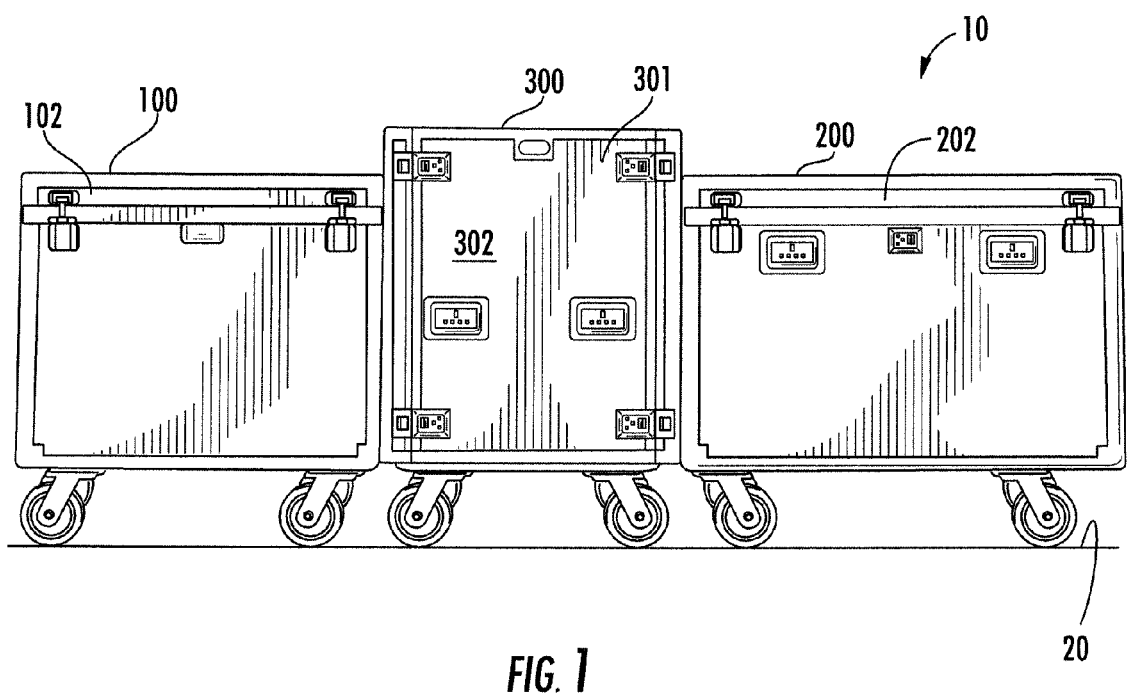

Having thus described the invention in general terms, reference will now be made to the accompanying drawings, which are not necessarily drawn to scale, and wherein:

FIG. 1 illustrates a front perspective view of an event production kit according to various embodiments of the invention.

Figure 2:
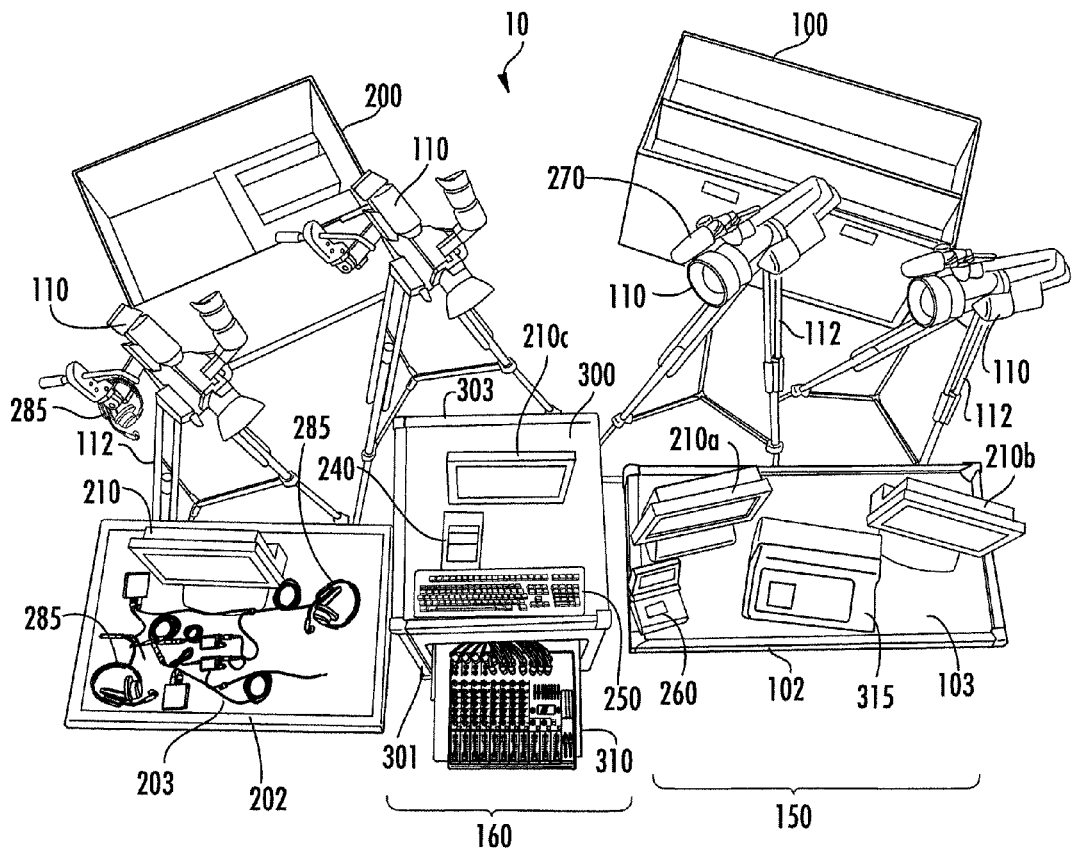

FIG. 2 illustrates a perspective view of the event production kit shown in FIG. 1 with the equipment removed from the storage cases according to one embodiment of the invention.

Figure 3:
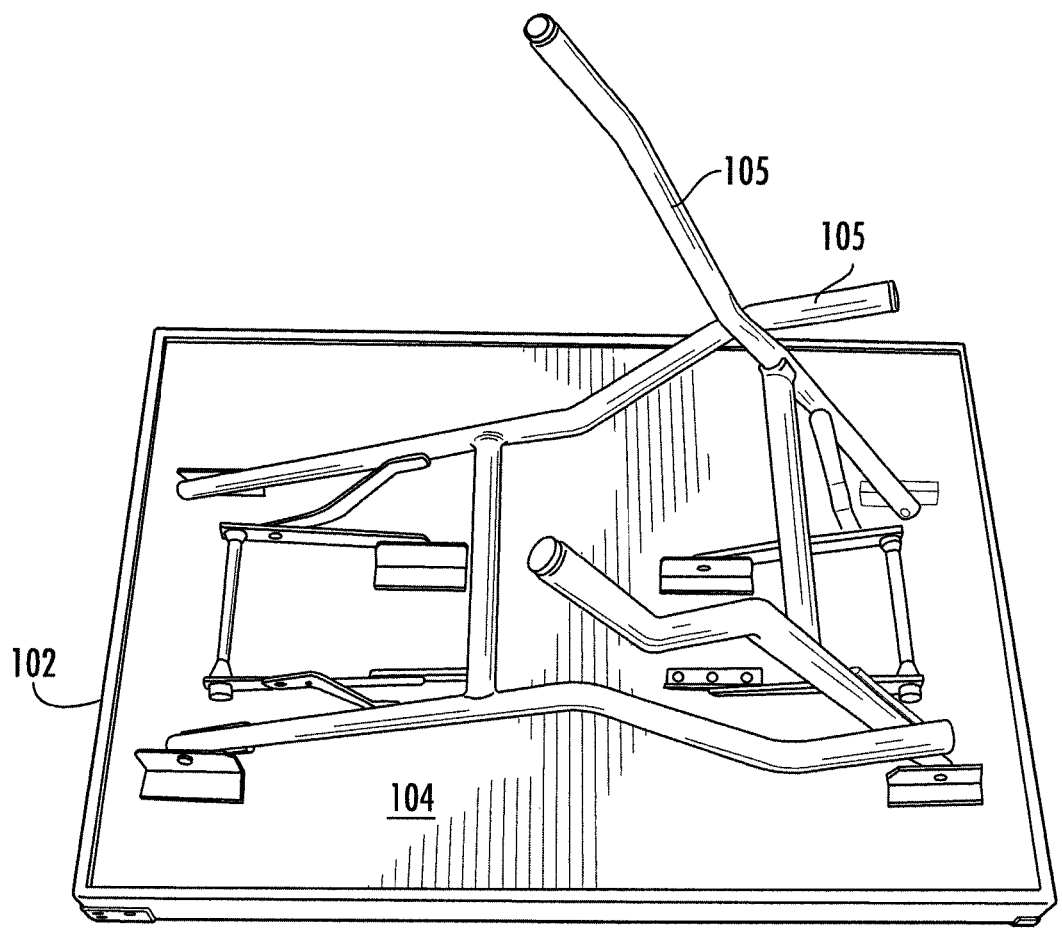

FIG. 3 illustrates a bottom perspective view of a top lid of the first storage case shown in FIG. 1, according to one embodiment of the invention.

Figure 4:
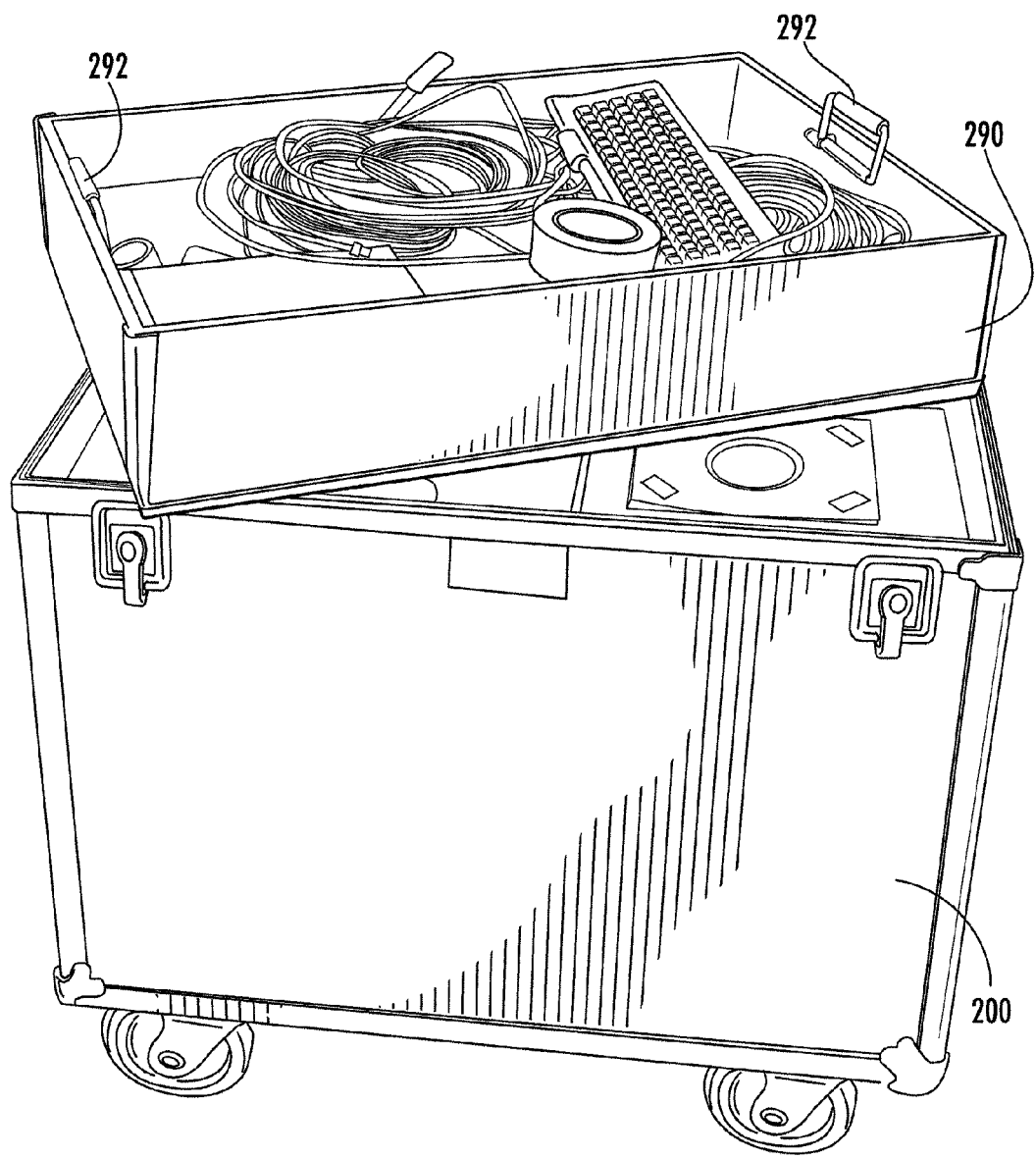

FIG. 4 illustrates an upper perspective view of the second storage case shown in FIG. 1 with the lid removed, according to one embodiment of the invention.

Figure 5A:
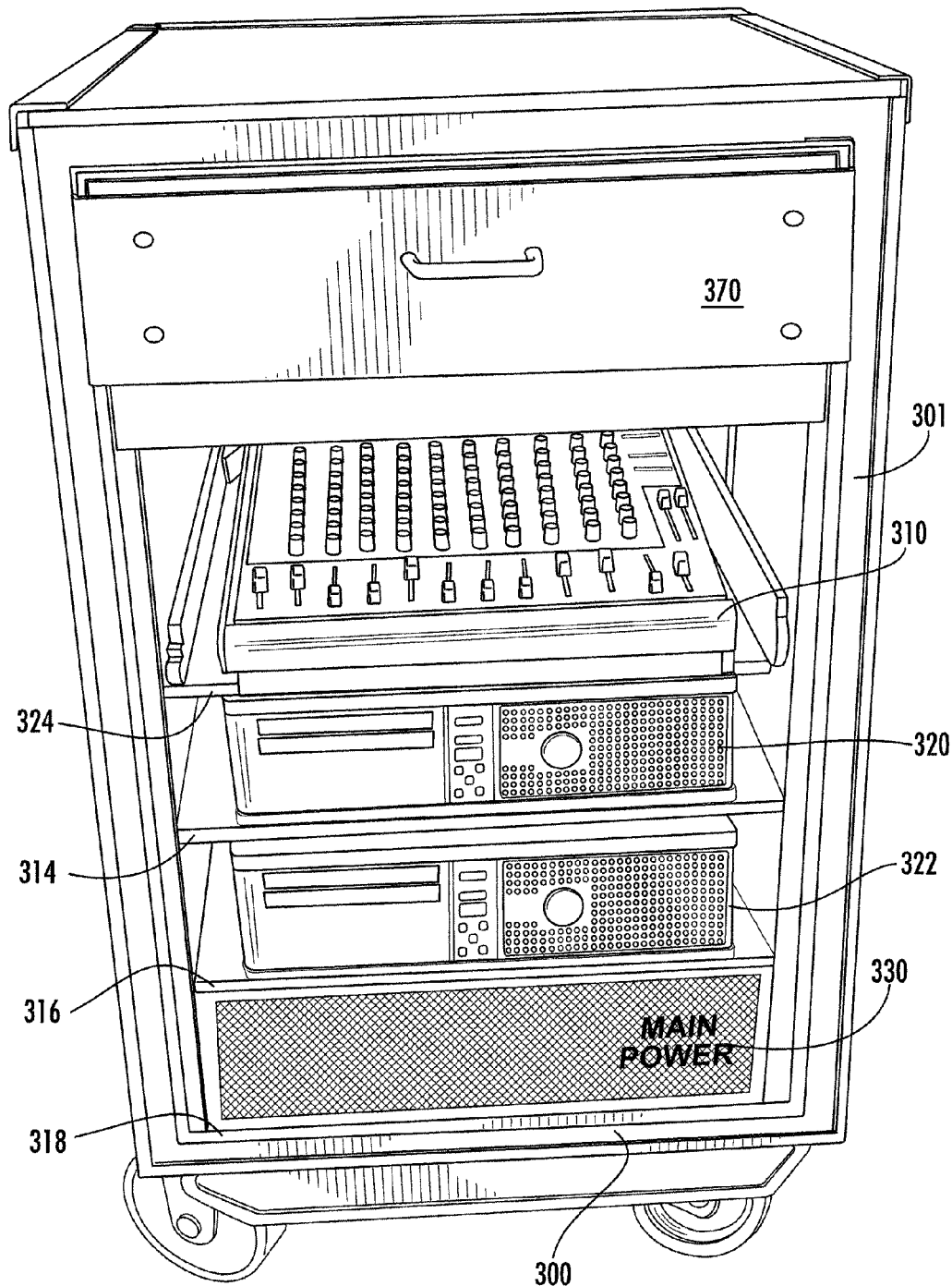

FIG. 5A illustrates a plan view of the electronic production equipment case shown in FIG. 1 with the front panel removed, according to one embodiment of the invention.

Figure 5B:
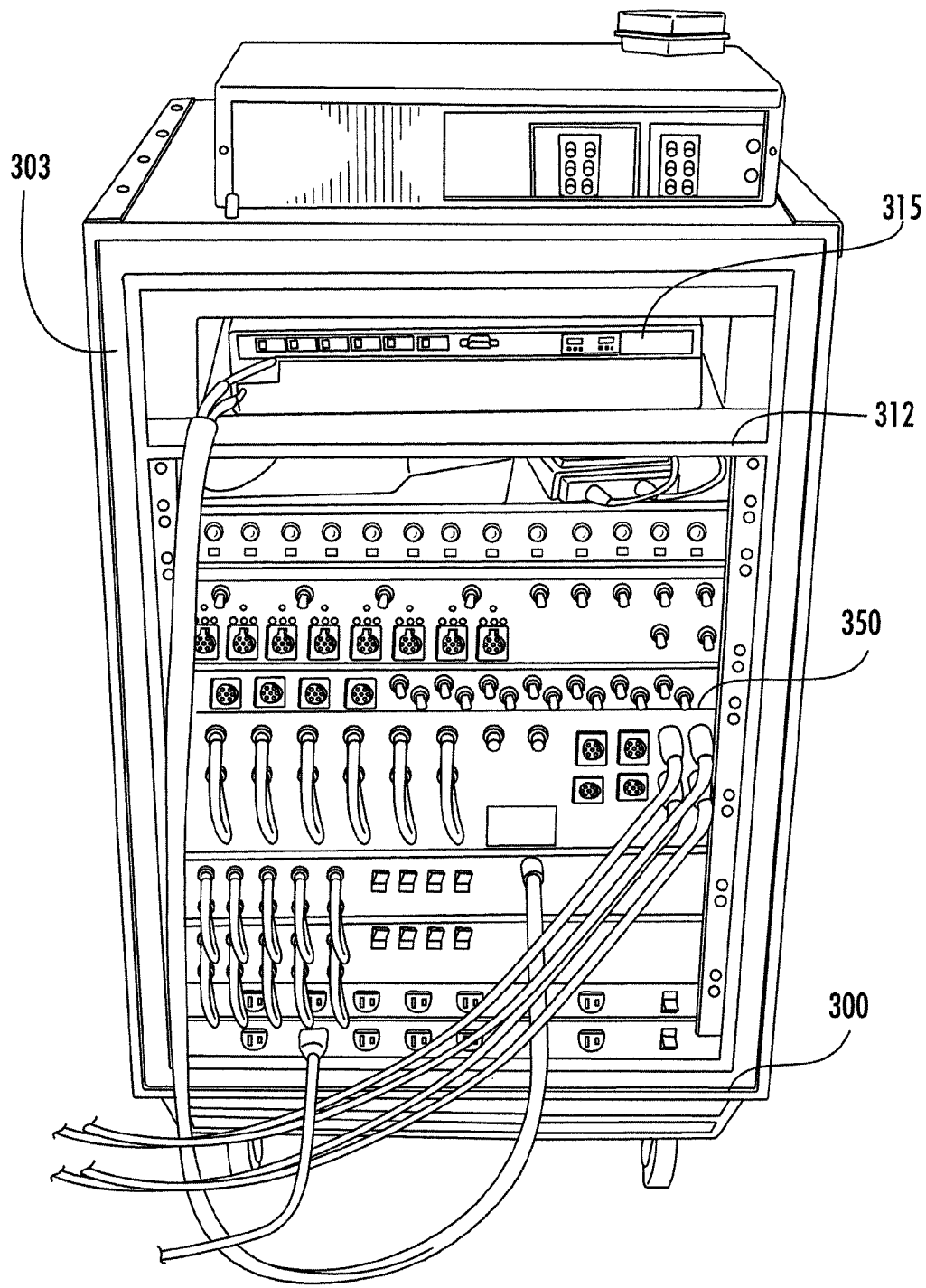

FIG. 5B illustrates a plan view of the electronic production equipment case shown in FIG. 1 with the back panel removed, according to one embodiment of the invention.

Figure 6:
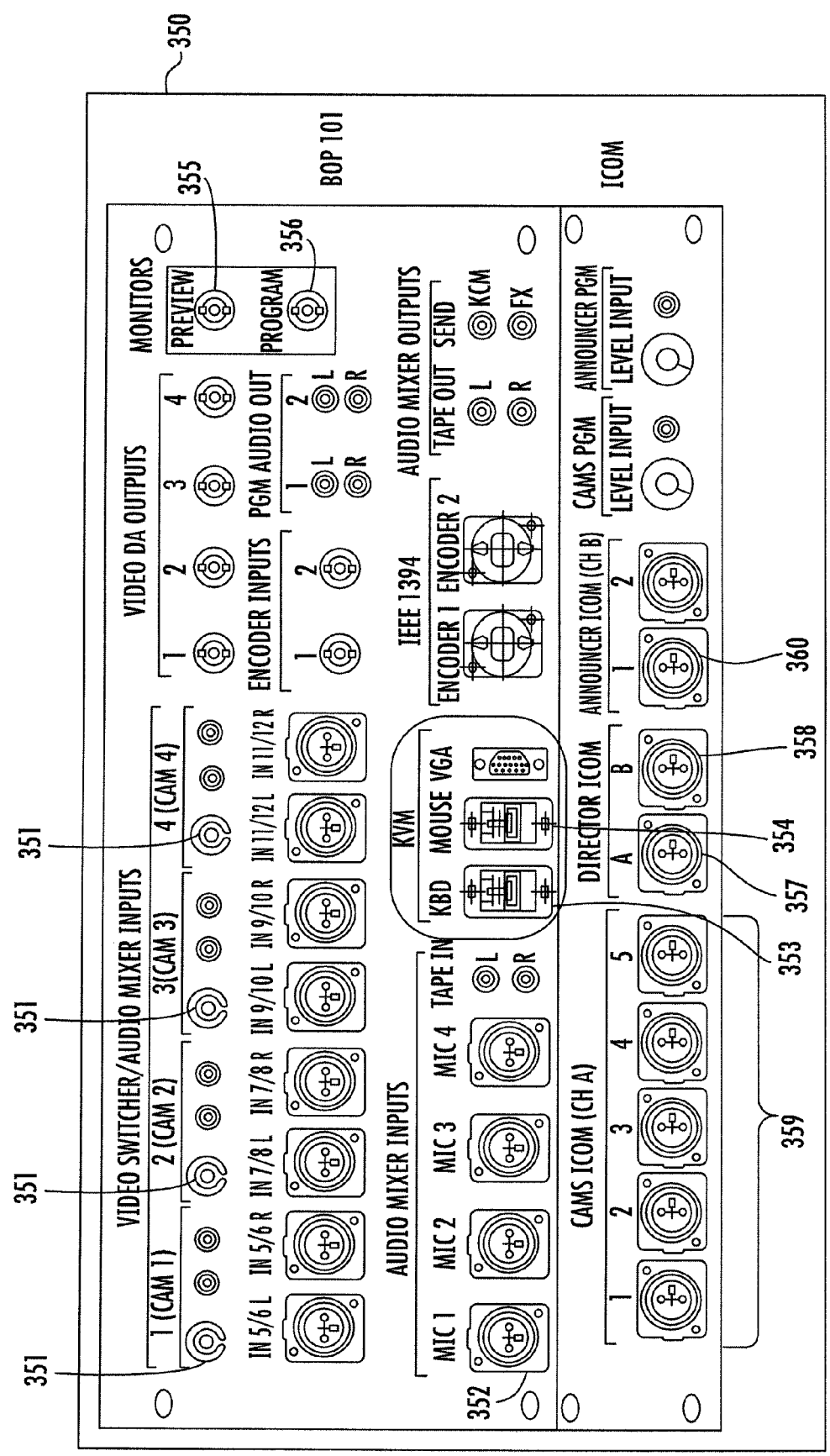

FIG. 6 illustrates the vertical back panel of the electronic production equipment case shown in FIG. 1, according to one embodiment of the invention.

Figure 7:
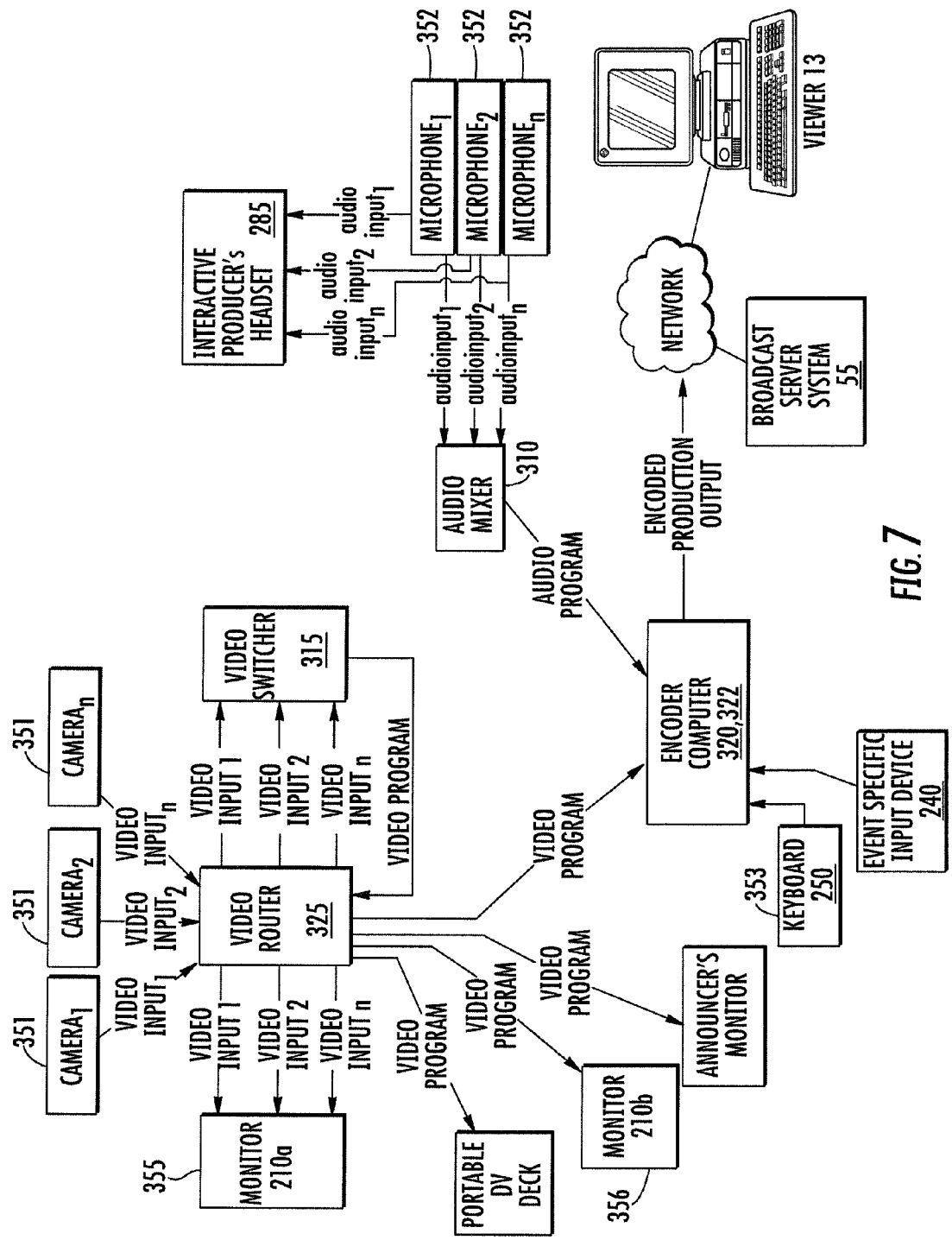

FIG. 7 illustrates a wiring diagram according to one embodiment of the invention.

Figure 8:
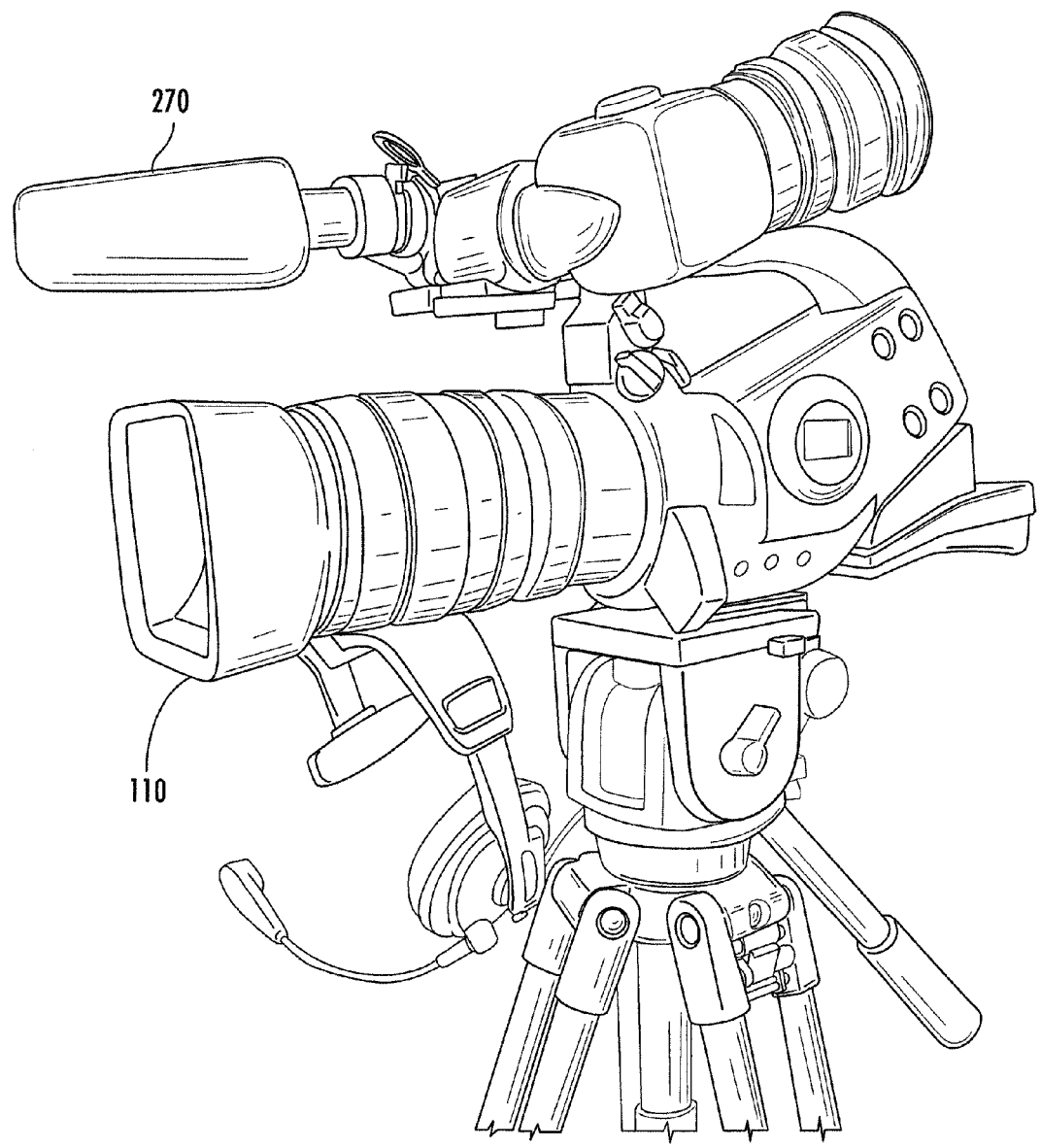

FIG. 8 illustrates a perspective view of a camera and camera mounted microphone according to one embodiment of the invention.

Figure 9:
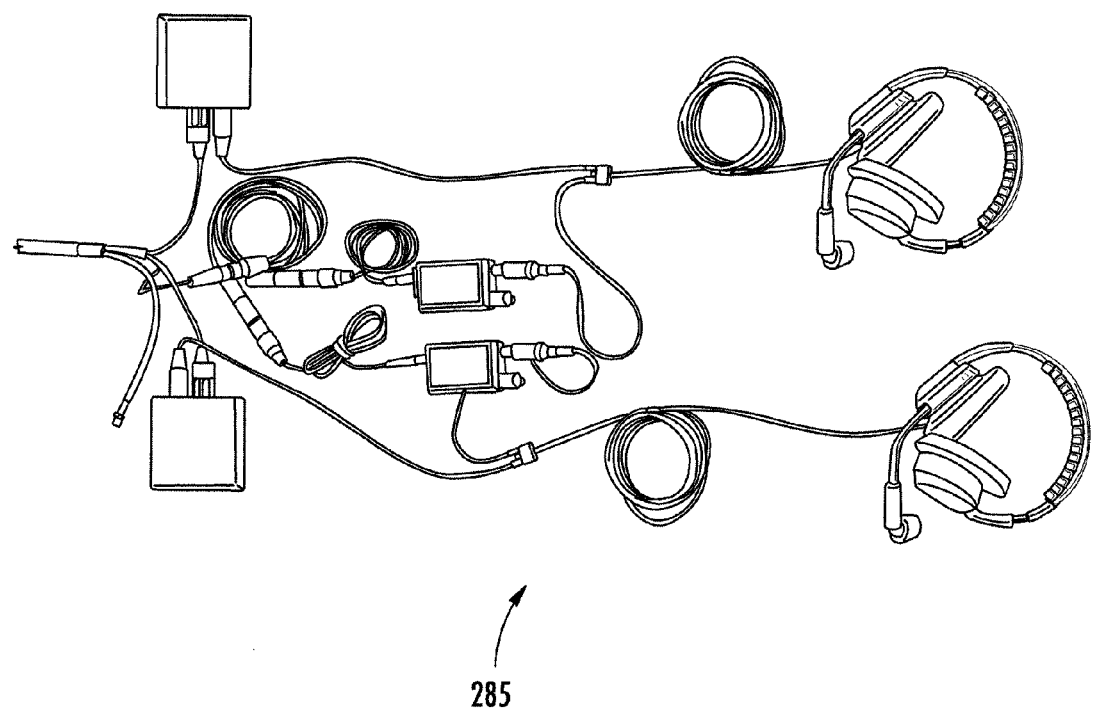

FIG. 9 illustrates an upper view of two microphone headsets according to one embodiment of the invention.

Figure 10:
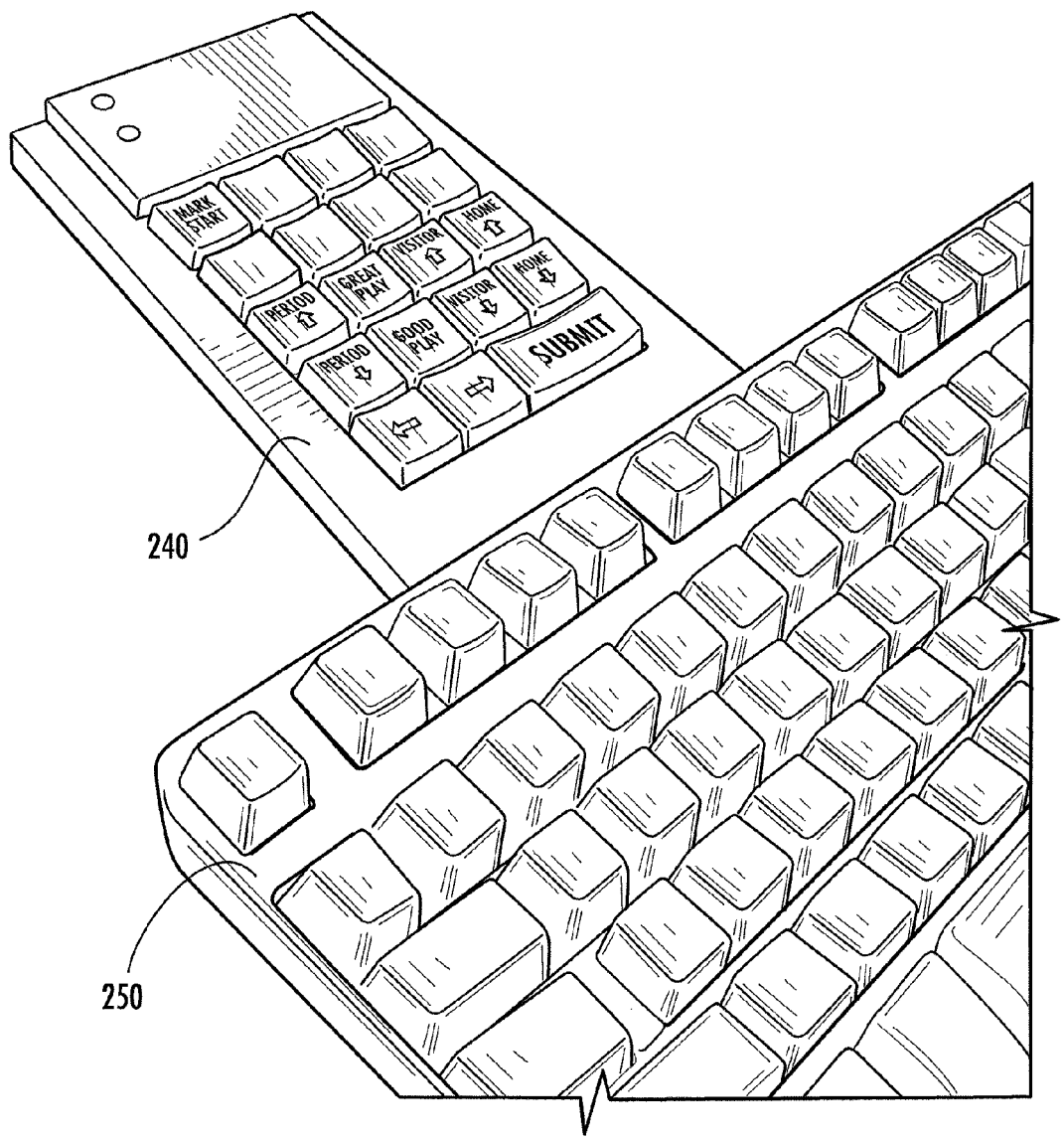

FIG. 10 illustrates an upper perspective view of the event-specific input device and the keyboard according to one embodiment of the invention.

Figure 11:
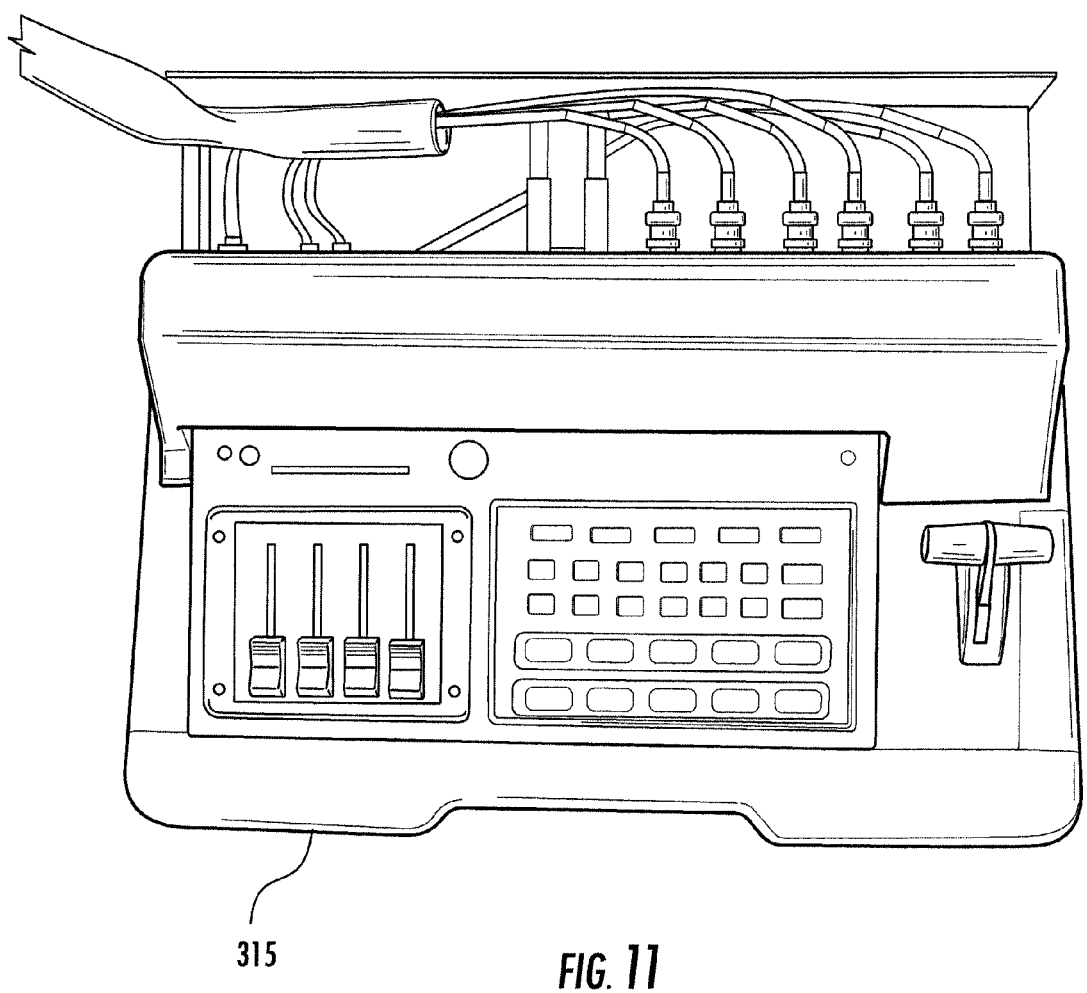

FIG. 11 illustrates an upper view of the video switcher according to one embodiment of the invention.

Figure 12:
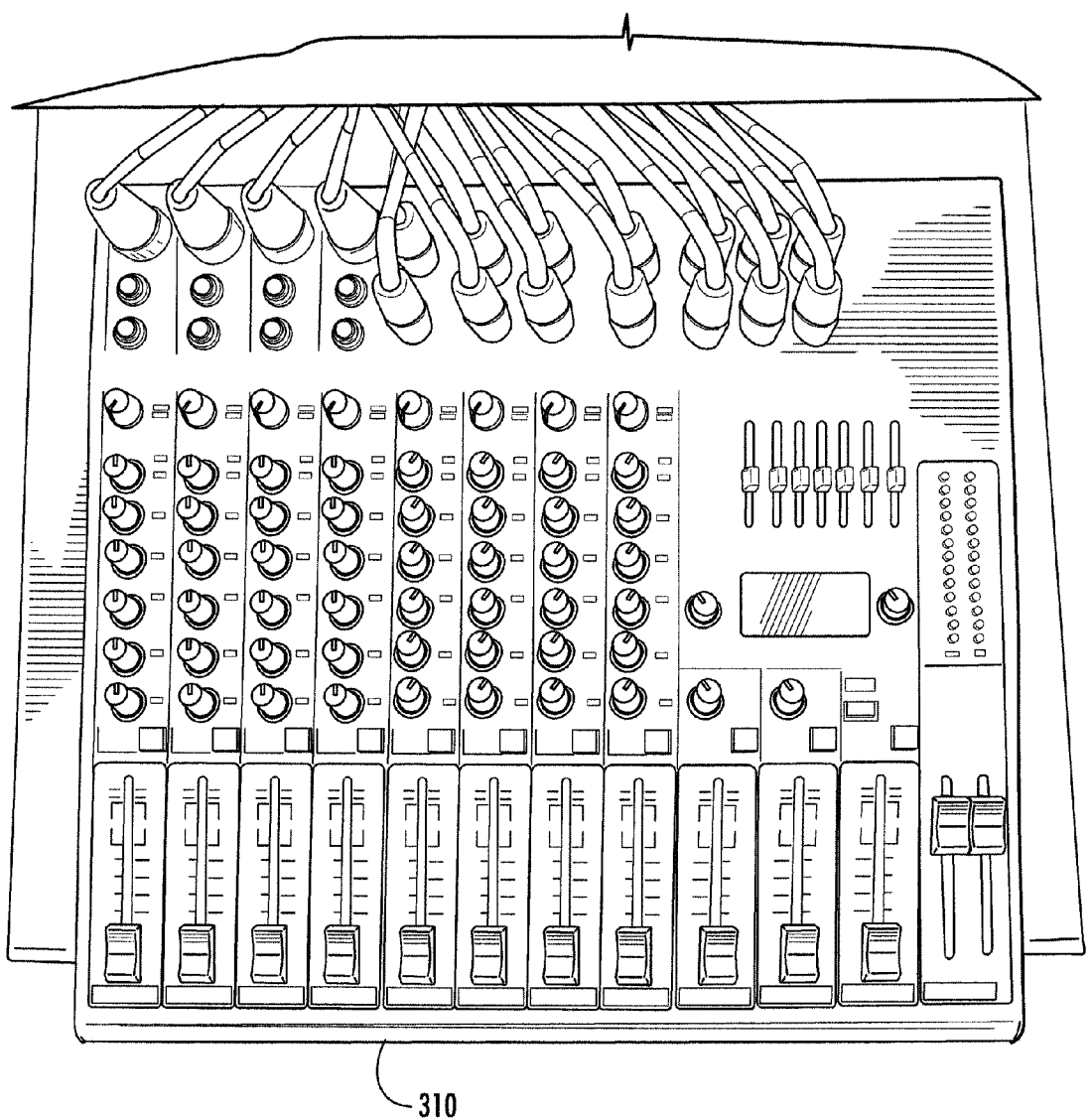

FIG. 12 illustrates an upper view of the audio mixer according to one embodiment of the invention.

Figure 13:
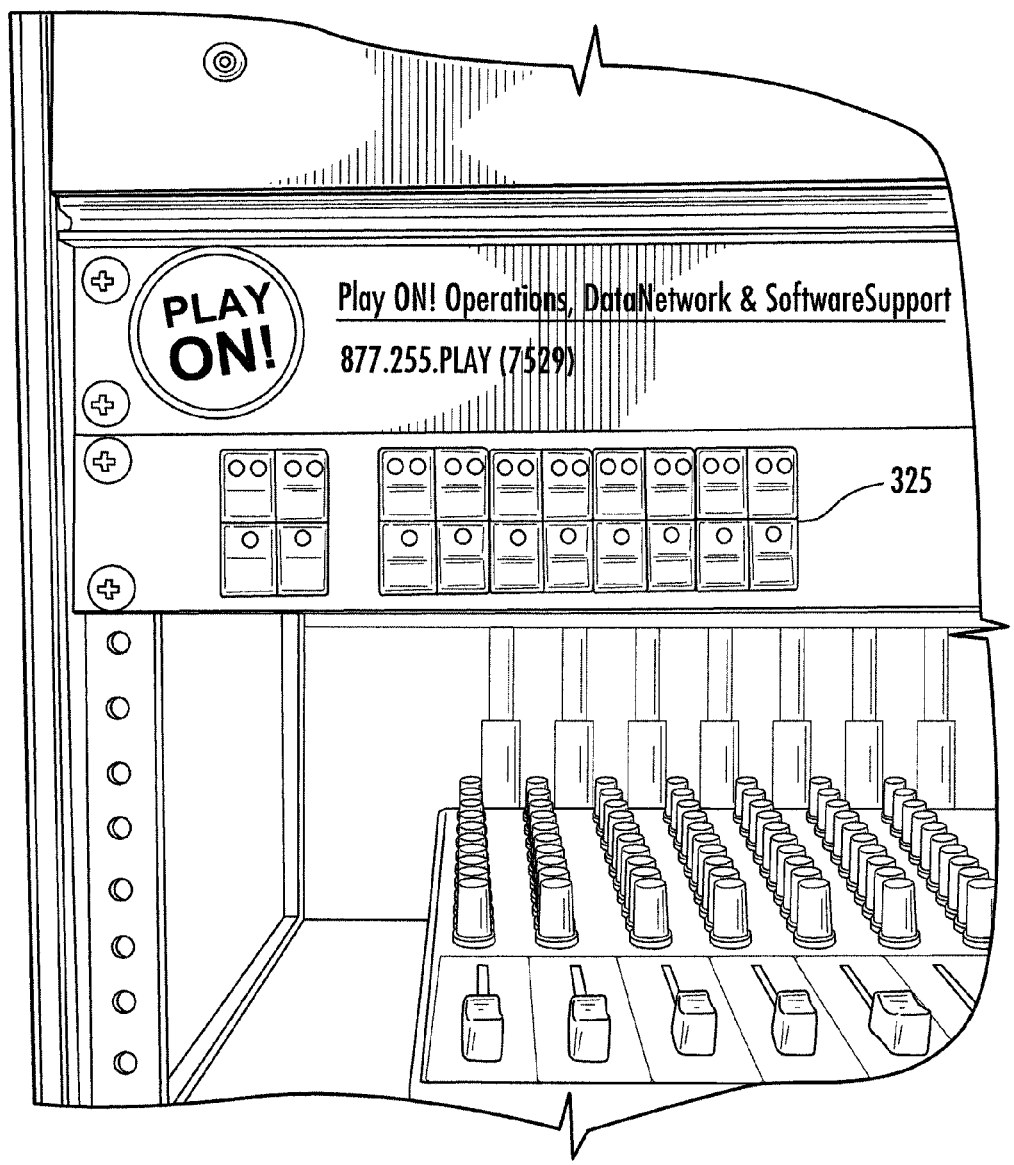

FIG. 13 illustrates a front view of the video router according to one embodiment of the invention.

Figure 14:
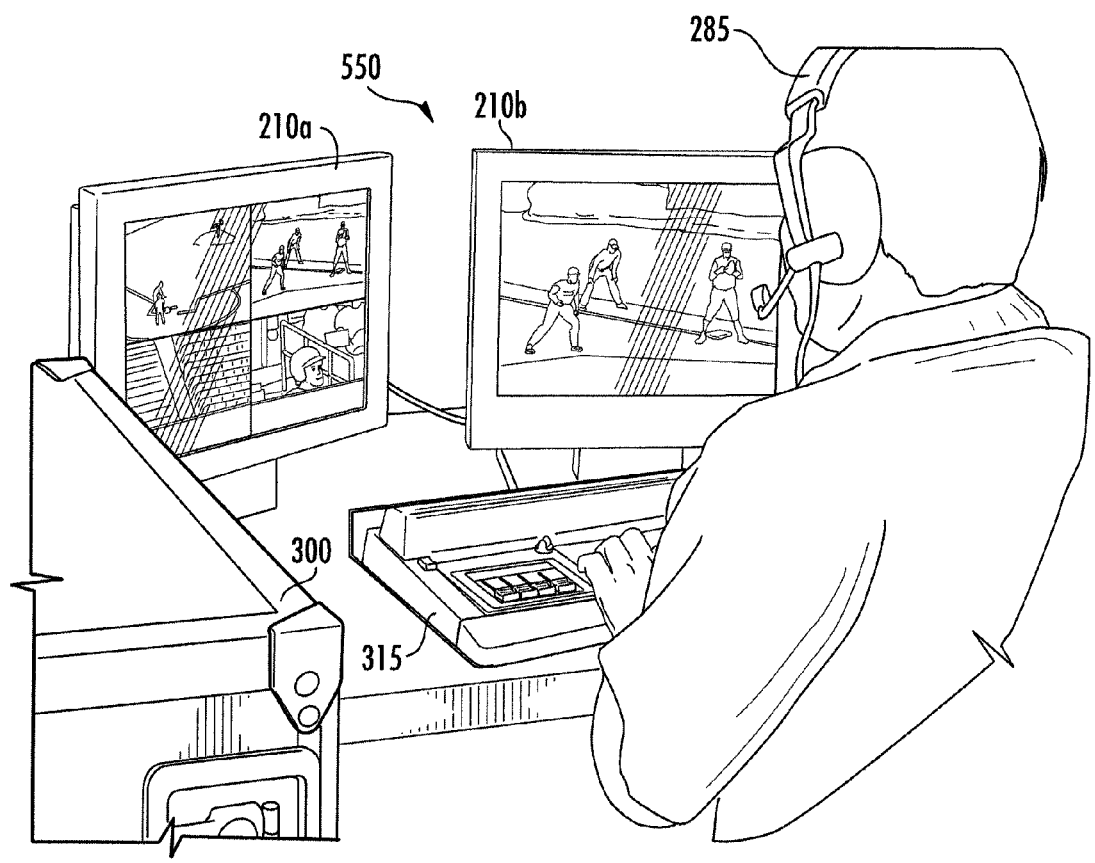

FIG. 14 illustrates a view of the director's workstation according to one embodiment of the invention.

Figure 15:
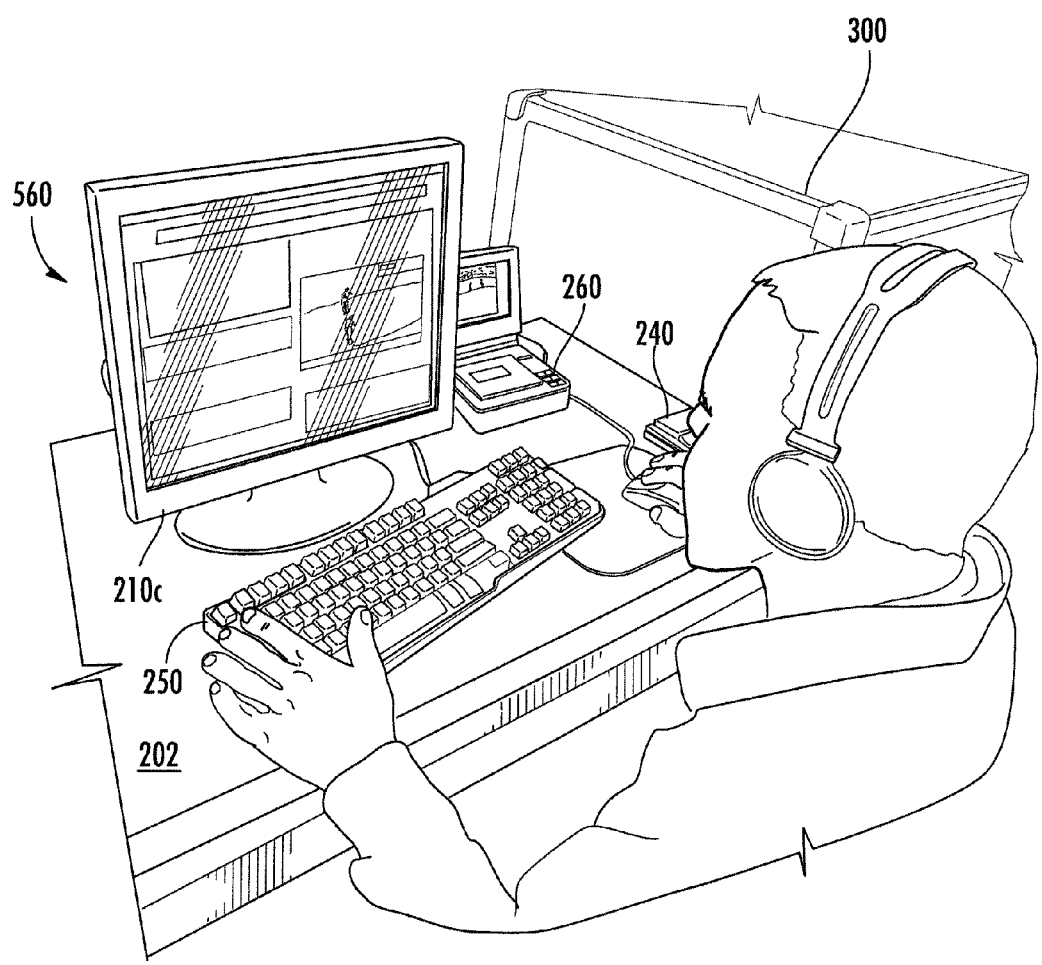

FIG. 15 illustrates a partial view of the interactive producer's workstation according to one embodiment of the invention.

DETAILED DESCRIPTION OF VARIOUS EMBODIMENTS OF THE INVENTION

Various embodiments of the present invention now will be described more fully with reference to the accompanying drawings, in which some, but not all embodiments of the invention are shown. Indeed, various embodiments of this invention may be embodied in many different forms and should not be construed as limited to the embodiments set forth herein. Like numbers refer to like elements throughout.

According to various embodiments of the invention, an event production kit is provided that includes production equipment (e.g., cameras, microphones, monitors, a computer, an audio mixer, and a video switcher) used to produce an audio/video production of an event, such as, for example, a sporting event or festival, for distribution to viewers. The production may be distributed (or broadcast) over the Internet (e.g., via broadband), television, or cable systems, for example. To facilitate transporting the event production kit to the event location and to reduce the amount of time and resources required for setting up the equipment prior to the event, various embodiments of the kit include storage cases for storing the production equipment and provide a pre-wired electrical panel through which the production equipment can be coupled to the video switcher, the audio mixer, and an encoder for encoding the production and distributing it over a network. In addition, the selection of the type of equipment included in the kit, according to one embodiment, provides for a high quality, lower cost production than is currently available. For example, currently available production equipment may cost around $20,000 and take a week or two to set up prior to the event, but various embodiments of the production kit described in this application may cost less than $2,000 and take a few hours to set up. Furthermore, the production kit may also include a training manual (e.g., in electronic format or in a paper format) for providing instructions to users of the kit on how to set up the equipment. Various embodiments of the event production kit are described in more detail below.

FIG. 1 illustrates an event production kit according to various embodiments of the invention. In this embodiment, the event production kit 10 includes two storage cases 100, 200 and an electronic production equipment case 300. However, depending on the scale of the event being produced, other embodiments of the kit 10 may include one storage case or three or more storage cases. The storage cases 100, 200 and the electronic production equipment case 300 may be manufactured of steel, metal, wood, or other suitable material, and each includes a set of wheels or casters along a bottom side of the case 100, 200, 300 that allows the case 100, 200, 300 to roll along a support surface 20, such as a floor or the ground.

According to various embodiments, the cases 100, 200, 300 are box-shaped, and a width of each case 100, 200, 300 may be limited to between about 30 inches and about 36 inches to allow the cases 100, 200, 300 to fit through a doorway. In addition, the total footprint of the cases 100, 200, 300 may be limited to allow the cases 100, 200, 300 to fit within the back of a sport utility vehicle or minivan. However, in various alternative embodiments, the cases 100, 200, 300 may have other shapes, such as cylindrical, may have other dimensional limitations, or may be larger than 36 inches wide or smaller than 30 inches wide.

Storage Cases

In the embodiment shown in FIGS. 1-3, the two storage cases 100, 200 include removable top lids 102, 202, respectively, that can serve as table tops for supporting the production equipment. In the embodiment shown in FIG. 3, which shows the bottom view of top lid 102, one or more foldable legs 105 are coupled to a lower surface 104 of the removable top lid 102, and the legs 105 can be extended downwardly from the lower surface 104 of the removable top lid 102 to support the lid 102 above the support surface 20. Top lid 202 is similarly configured. The upper surfaces 103, 203 of the lids 102, 202 are then usable as a table top on which production equipment can be placed and used by the production team.

According to various embodiments of the invention, the equipment stored in the cases 100, 200 may include one or more cameras 110, tripods 112, cables 120, microphones 270, monitors 210, keyboards 250, microphone headsets 285, portable DV decks 260, and event-specific input devices 240 (e.g., a score keeper device for a sporting event). In a particular embodiment, which is shown in FIG. 2, the storage case 100 includes at least four compartments that are separated by vertical dividers. Each compartment is accessible after the top lid 102 is removed from the open top of the case 100. The first compartment is sized and shaped to store at least four camera bags that each include a camera 110 (e.g., a Canon XL2 video camera), a tally system (not shown) (e.g., Datavideo TD-1), a battery pack (e.g., Canon DP945) (not shown), and a microphone headset (e.g., Intercom DMH-320) for each cameraman. The second compartment is sized and shaped to store at least four tripods 112 (e.g., Bogan 351MVB2 and Bogan 3460HK), and the third compartment and the fourth compartment are each sized and shaped to store at least two cables 120. Each cable 120 is used to transmit a video and/or audio signal from each video camera 110 to the electronic production equipment case 300. As shown in the embodiment in FIGS. 2 and 4, the storage case 200 includes five compartments that are separated by vertical dividers and a removable accessories shelf 290 that is sits atop the five compartments. The five compartments are defined by the vertical dividers, which includes outer walls that are disposed adjacent the inner vertical walls of the case 200. According to one embodiment, the vertical dividers are manufactured from a high density foam material.

In addition, according to one embodiment, the accessories shelf 290 is a rectangular-shaped, open top box that fits on top of the vertical dividers. In a particular embodiment, a perimeter of the bottom side of the shelf 290 is smaller than the inside perimeter of case 200 such that the bottom side of the shelf 290 is adapted to fit within the side walls of the case 200, and the bottom side of the shelf 290 is supported by at least a portion of the vertical dividers. In addition, according to one embodiment, the accessories shelf 290 further defines handles 292 in at least two opposite sides thereof, which allow the production team to move the accessories shelf 290 in and out of the case 200 more easily. However, in various other embodiments, the accessories shelf 290 may have other shapes, such as cylindrical.

According to various embodiments, the first compartment, second compartment, and third compartment of the case 200 are each sized and shaped to receive a screen portion of a flat-screen monitor 210 (e.g., a Panasonic WV-LD 5000). In particular, each monitor 210 is positioned upside down in each compartment such that the screen portion is disposed within the compartment and a base of the monitor 210 is facing upwardly. The base of the monitor 210 is supported by the walls of the compartment holding the monitor 210. The fourth compartment is sized and shaped to receive at least two shotgun microphones (e.g., Azden SGM-1x), four camera-mounted microphones (e.g., Canon DM-50), a microphone headset for an announcer or MC of an event (e.g., Production Intercom DMH-9000), and a handheld microphone (e.g., EV 635A). The fifth compartment is sized and shaped to receive a portable DV deck (e.g., the Sony Clamshell Recorder) and an event-specific input device (e.g., a score input device for use at a sporting event). The accessories shelf 290 may include additional cables, adapters, tape, and power extension cords (also called "stingers"). Although the above described embodiments recite the inclusion of three monitors and eight microphones, it should be understood that this number can vary depending on the needs of the production team according to other embodiments of the invention.

According to one embodiment of the invention, the event-specific input device is configured for allowing a user to input the score of each team participating in a sporting event, the period in the game (e.g., first quarter, first half, first period), and a time in the game at which a level or type of play (e.g., "good", "great", touchdown, three-point basket, goal) was made. FIG. 10 illustrates a particular embodiment of an event-specific device 240. As shown, the device 240 includes up and down buttons to increase and decrease the score of the home team or the visiting team, up and down buttons to increase and decrease the period in the game, a "good play" button to indicate a time at which a good play occurred, and a "great play" button to indicate a time at which a great play occurred. The score and period in the game may be received from the input device 240 and overlaid over a portion of the video program distributed to viewers. In addition, the good play and great play buttons may be used by a member of the production team to create a highlight file for the event, which is described in more detail in co-pending U.S. patent application Ser. No. 11/851,039 filed Sep. 6, 2007 and entitled "Systems and Methods for Scheduling, Producing, and Distributing a Production of an Event," which is assigned to the assignee of this application and is herein incorporated by reference in its entirety.

Electronic Production Equipment Case

In the embodiment shown in FIGS. 1, 2, 5A, 5B, and 6, the electronic production equipment case 300 includes a removable front panel 302 and a removable back panel 304 that are coupled to a front side 301 and a back side 303, respectively, of the case 300. Removal of the front panel 302 allows the production team access to the equipment stored in the case 300, and removal of the back panel 304 allows the production team access to a vertical panel 350 that includes a plurality of pre-wired connection ports for connecting the equipment stored in the storage cases 100, 200 to the equipment stored in the electronic production equipment case 300. In addition, in a further embodiment, the case 300 further comprises a drawer 370 accessible from the front side 301 of the case 300.

According to one embodiment of the invention, the electronic production equipment case 300 stores an audio mixer 310 (e.g., Beringer Xenyx 1222FX), a video switcher 315 (e.g., Datavideo SE-500), at least two computers 320, 322 (e.g., Dell Optiplex 620) that are configured to encode the production for distribution over a network, a video router 325 (e.g., Video Router V0808CP), and a power supply 330 (e.g., APC AME DR800BLK) that is capable of power conditioning and has a back up battery. According to the embodiment shown in FIGS. 5A and 5B, the case 300 includes a first horizontal shelf 312 on which the video switcher 315 and the video router 325 are stored, a second horizontal shelf 314 and a third horizontal shelf 316 on which each computer 320, 322 is stored, a fourth horizontal shelf 318 on which the power supply 330 is stored, and a fifth horizontal shelf 324 on which the audio mixer 310 is stored. In one embodiment, the first horizontal shelf 312 is accessible from the back side 303 when the back panel is removed, and the second 314, third 316, fourth 318, and fifth horizontal shelves 324 are accessible from the front side 301 when the front panel 302 is removed. In addition, the fourth horizontal shelf 318 for storing the power supply 330 may be the upper surface of the bottom side of the case 300, and the fifth horizontal shelf 324 may be slidably mounted to the inner side walls of the case 300 such that the shelf 324 can be moved from below the perimeter of the top side of the case 300 to at least partially outside of the perimeter of the top side of the case 300. This slidable shelf 324 allows access to the audio mixer 310 without having to remove it from the case 300.

As noted above, the vertical panel 350 of the case 300 includes a plurality of connection ports, according to various embodiments. The connection ports are pre-wired within the case 300 to the electronic production equipment stored in the case 300, which in one embodiment allows for an easy and quick set up. An exemplary wiring scheme is discussed below in relation to FIG. 7.

Exemplary Production Set-Up

FIG. 2 illustrates an exemplary set up of the equipment stored and included in the event production kit 10 to allow a production team to produce an event according to one embodiment of the invention. In particular, the lids 102, 202 are removed from the cases 100, 200 and set up as tables as described above, and the equipment stored in the cases 100, 200 is removed and placed upon the tables. The embodiments shown in FIGS. 2 and 14 illustrate a director workstation 150, 550 that is set up on one side of the electronic production equipment case 300 by placing two monitors 210a, 210b and the video switcher 315 on top of a table, such as table 102. In a particular embodiment, the first monitor 210a displays the video signals from each camera 110 simultaneously, and the director uses the video switcher 315 to select one of the video signals as the video signal for the program. In a particular embodiment, the second monitor 210b displays the video signal selected by the director using the video switcher 315. According to one embodiment, the video switcher 315 may also be used to control the lights coupled to the one or more cameras 110 through the tally systems.

The embodiments shown in FIGS. 2 and 15 illustrate an interactive producer workstation 160, 560 which is set up on the opposite side of the case 300 by placing a third monitor 210c, the portable DV deck 260, the event-specific input device 240, the keyboard 250, and a mouse on top of a table, such as table 202. In a particular embodiment, the monitor 210c, keyboard 250, mouse, and event-specific input device 240 are coupled to the computers 320, 322 and are used by the interactive producer to interface with the encoding software, the Internet, and event management software running on the computers 320, 322. In one embodiment, the first computer 320 serves as the main computer, and the second computer serves as a backup for the first computer 320 in case the first computer 320 has problems. The portable DV deck 260 displays the video output selected by the director for the program.

FIGS. 6 and 7 illustrate a vertical panel 350 and a wiring diagram for the equipment and the vertical panel 350, respectively, according to a particular embodiment of the invention. As shown in FIG. 6, each of the cameras 110 is connected via a cable to the camera input ports 351 located on the vertical panel 350, and each microphone 270 is connected via a cable to the audio input ports 352 located on the vertical panel 350.

In a particular embodiment, one camera 110 and two or more microphones 270 may be coupled to a camera input port 351 and two or more audio input ports 352, respectively, using a single, Siamese-type cable that includes one video signal connector and two or more audio signal connectors. The first director monitor 210a is connected to preview port 355 via a cable to receive the video signals from each of the camera. A cable from the second director monitor 210b is connected to a program port 356 to receive the video program signal. Cables from the cameramen's microphone headsets 285 are plugged into ports 359, and cables from the announcer's microphone headset 285 are plugged into port 360. Furthermore, the keyboard 250, mouse, and event-specific input device 240 are connected to a respective port 353, 354.

In a particular embodiment, the video switcher 315 is coupled to the video router 325 via a cabled tether. The cabled tether allows the video switcher 315 to be removed from the first horizontal shelf 312 and placed on the director's workstation 150 without the members of the production team having to couple any wires between the video switcher 315 and the video router 325 during set up.

As shown in FIG. 7, the camera input ports 351 are pre-wired to send a video signal from each camera 110 to the video router 325, and the video router 325 is pre-wired to send the video signals to the video switcher 315 and the port 355 for the first director monitor 210a. The output from the video switcher 315, which sends the video program signal selected by the director, is pre-wired to a video program selection input of the video router 325, and video program selection outputs of the video router 325, which transmit the video program signal selected by the director, are pre-wired to the computers 320, 322, the port 356 for the second director monitor 210b, a port for coupling the portable DV deck 260 to the vertical panel 350, and a port for coupling an announcer monitor (not shown) to the vertical panel 350.

In addition, the audio input ports 352 are pre-wired to send an audio signal from each microphone 270 to the audio mixer 310 and a port for coupling the interactive producer's headset 285 to the vertical panel 350, and the output of the audio mixer 310 is pre-wired to send an audio program output to the computers 320, 322. The interactive producer uses the audio mixer 310 to select the level at which each audio input is to be heard, and this selection, which is the audio program output, is sent to the computers 320, 322. In one embodiment, the output of the audio mixer 310 is also sent to a port for coupling speakers at the interactive producer's workstation to the vertical panel 350. Furthermore, respective ports 353, 354 for the keyboard 250 and mouse are pre-wired to the computers 320, 322, and a port for the event-specific input device 240 is pre-wired to the computers 320, 322.

According to various embodiments, the production team uses communication transceivers to communicate with one another. For example, in one embodiment, the team uses short wave radios or wireless headsets to communicate with each other. However, in another embodiment, the team uses microphone headsets 285 that are wired through the vertical panel 350 to communicate with each other. In particular, a first channel of the director's microphone headset 285 is plugged into port 357 to allow the director to communicate with the cameramen, and a second channel of the director's microphone headset 285 is plugged into port 358 to allow the director to communicate with the announcer.

In addition, the power cords of the monitors 210 at both workstations and the power cord for the portable DV deck 260 are plugged into the power supply 330. In one embodiment, the power supply 330 is a power adjustment system, such as, for example, the APC AME DR800BLK, that provides power conditioning and backup power (e.g., via a back-up battery) to the equipment in the event of an external power failure or if the external power source is otherwise unavailable.

In various other embodiments, the video router 325 is not included in the kit 10, and the camera input ports 351 for each camera 110 are pre-wired to route each video signal to the video switcher 315 and the preview port 355 for the first director's monitor 210a directly. In addition, the output from the video switcher 315 that transmits the video signal selected by the director is pre-wired to computers 320, 322, the port 356 for the second director's monitor 210b, the port for the portable DV deck 260, and the port for the announcer's monitor directly.

Various Software Used in Event Production and Management

The computers 320, 322 according to various embodiments are configured to run an event management software program, such as, for example, the event management program described in co-pending U.S. patent application Ser. No. 11/851,039 entitled Systems and Methods for Scheduling, Producing, and Distributing a Production of an Event and filed Sep. 6, 2007, which is assigned to the assignee of this application and is herein incorporated by reference in its entirety. The event management program allows the interactive producer (or another member of the production team) to schedule the broadcast of the event prior to the event and set up various parameters of the event, such as the type of event (e.g., sporting, performance, festival), specific details describing the event (e.g., teams playing, sport being played, performers, location of festival), whether the event will be broadcast live or will be available on demand (VOD), the date and time of the event, and who will be able to view the event (e.g., subscribers to a particular service, the public).

In addition, the event management program allows the interactive producer or other member of the production team to test the production equipment and software (e.g., test the connectivity of the equipment and the Internet or other network to which the equipment may be connected, test the encoding software), add special effects to the program to be broadcast (e.g., scoreboards, borders, animation, logos, sound), toggle between the program being "on air" and "off air", and start and stop the saving of the program to an archive file. The encoding software program, such as, for example, Windows Media Encoder, receives the video program output from the video router, the audio program output from the audio mixer, and any special effects from the event management program. The encoding software combines these signals into the full program and encodes the full program for distribution over a network, such as, for example, a private wide area network or the Internet. In one embodiment, the encoded full program is transmitted to a broadcast server, and the broadcast server distributes the encoded full program to viewers connected to the broadcast server over a network, such as, for example, a private wide area network or the Internet.

According to various embodiments, the full program may be stored on the computers 320, 322 and/or stored on a server remotely located from the computers 320, 322. For example, in one embodiment, the full program is stored on the broadcast server, and in another embodiment, the full program is stored on a webserver that is separate from the broadcast server and which provides the event management software to the computers 320, 322.

Various embodiments of the invention provide a kit for storing and utilizing high quality, low cost production equipment for recording and producing events, such as sporting events, plays, festivals, etc. In one embodiment, the kit is sized to fit into the back of mini van or truck, which reduces costs for transporting production equipment to an event. In addition, according to one embodiment, the event management software allows the production team to control and manage the scheduling, production, and distribution of a program from one system, which reduces the time and resources needed to schedule, produce, and distribute a program.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended listing of inventive concepts. Although specific terms are employed herein, they are used in a generic and descriptive sense only and not for purposes of limitation.

The invention claimed is:

1. A production kit having component parts capable of being assembled at a production site, the kit comprising the combination of:
- a first case capable of storing equipment used in recording and producing an event, said equipment comprising:
  - one or more video cameras; and
  - two or more audio communication transceivers, said audio communication transceivers capable of allowing two or more members of a production team to communicate with each other remotely;
- a second case capable of storing equipment used in recording and producing an event, said equipment comprising:
  - two or more monitors;
  - at least one keyboard; and
  - one or more microphones;
- a third case capable of storing equipment used in recording and producing an event, said equipment comprising:
  - a video switcher, said video switcher capable of receiving video input from each of said one or more video cameras and allowing a video director to select a video input from one of said one or more video cameras as a video program output;
  - an audio mixer, said audio mixer capable of receiving audio input from each of said one or more microphones and allowing an audio director to select a level at which said audio input is to be output as an audio program output;
  - one or more encoder computers, each of said encoder computers capable of encoding a program output and transmitting said program output over a network, said program output comprising said video program output and said audio program output;
  - a vertical panel secured adjacent a back side of said third case, said vertical panel comprising a plurality of ports, each of said plurality of ports configured for receiving connectors from cables attached to each of said one or more cameras, each of said two or more monitors, each of said at least one keyboard, and each of said one or more microphones; and
  - a slidable horizontal shelf being movable from below a perimeter of a top side of said third case to at least partially outside a said perimeter, said horizontal shelf supporting said audio mixer,
  wherein:
    each of said ports configured for receiving connectors from cables attached to each of said one or more cameras and each of said two or more monitors is pre-wired to said video switcher,
    each of said ports configured for receiving connectors from cables attached to each of said one or more microphones is pre-wired to said audio mixer, and said video switcher, said audio switcher, and each of said ports configured for receiving connectors from cables attached to each of said at least one keyboard are pre-wired to said one or more encoder computers, said pre-wiring enabling a user to set up said equipment without substantial assembly.

2. The production kit of claim 1 wherein said first case and said second case are each box-shaped and comprise a removable lid, said lid having a substantially flat top surface and a bottom surface, wherein at least one foldable leg is coupled to said bottom surface, said at least one foldable leg capable of being unfolded for supporting said lid above said support surface such that said top surface is substantially parallel with said support surface.

3. The production kit of claim 1 wherein said third case has a substantially rectangular footprint and comprises a removable, vertically oriented front panel and a removable, vertically oriented back panel, said front panel being located on an opposite side of said third case from said back panel, wherein removal of said front panel allows access to said audio mixer and said one or more encoder computers, and wherein removal of said back panel allows access to said vertical panel.

4. The production kit of claim 3 wherein said removal of said back panel further allows access to said video switcher.

5. The production kit of claim 1 wherein a width of each of said cases is between about 30 inches and about 36 inches.

6. The production kit of claim 1 wherein said equipment in said production kit is used to record and produce a sporting event.

7. The production kit of claim 6 wherein said equipment capable of being stored in said second case further comprises an input device capable of receiving a score in said sporting event and transmitting said score to said one or more encoder computers.

8. The production kit of claim 7 wherein said input device is further capable of receiving an input indicating a type of play, said type of play being selected from the following: a good play and a great play.

9. The production kit of claim 1 wherein said first case defines a first compartment capable of storing said one or more cameras, a second compartment capable of storing one or more tripods, and a third compartment capable of storing one or more cables for coupling said one or more cameras to said vertical panel of said third case.

10. The production kit of claim 9 wherein said first compartment is capable of storing four cameras and said second compartment is capable of storing four tripods.

11. The production kit of claim 1 wherein said second case comprises a removable accessories shelf.

12. The production kit of claim 11 wherein said two or more monitors, said at least one keyboard, and said one or more microphones are stored in a lower portion of said second case and said accessories shelf is supported above said lower portion.

13. The production kit of claim 12 wherein said lower portion of said second storage case comprises a plurality of high density foam vertical dividers defining compartments in which said two or more monitors, said at least one keyboard, and said one or more microphones are stored, and said accessories shelf is supported by at least a portion of an upper surface of said vertical dividers.

14. The production kit of claim 1 wherein said one or more microphones comprises at least one shotgun microphone, at least one handheld microphone, at least one microphone for use with one of said one or more video cameras, and an announcer microphone for use with an announcer headset.

15. The production kit of claim 1 wherein said equipment capable of being stored in said third case further comprises a power system, said power system configured for providing power conditioning and a backup power supply.

16. The production kit of claim 1 wherein said equipment capable of being stored in said first case further comprises one or more tripods.

17. The production kit of claim 1 wherein said equipment capable of being stored in said second case further comprises a DV deck.

18. The production kit of claim 1 wherein said two or more audio communication transceivers comprise microphone headsets.

19. The production kit of claim 1 wherein each of said first case, said second case, and said third case comprises a set of wheels adjacent a bottom surface of each of said cases on which each case can roll along a support surface.

20. The production kit of claim 1 wherein said production kit further comprises a training manual for one or more users of said production kit, said training manual providing instruction on how to set up said equipment.

21. The production kit of claim 1 wherein said equipment capable of being stored in said first case further comprises one or more tally systems for said one or more cameras.

22. The production kit of claim 1 wherein said cables attached to one of said one or more cameras and two or more of said microphones are bundled together into a single Siamese cable.

23. The production kit of claim 1 wherein said equipment capable of being stored in said third case further comprises a video router capable of routing video signal data (1) from each of said ports configured for receiving connectors from cables attached to each of said one or more cameras to said video switcher and a first monitor of said two or more monitors and (2) from said video switcher to a second monitor of said two or more monitors and each of said one more encoder computers.

24. A method of setting up a production kit for recording and producing an event, said production kit comprising: (1) a first case capable of storing at least one video camera and at least two audio communication transceivers capable of allowing two or more members of a production team to communicate with each other remotely; (2) a second case capable of storing at least two monitors, at least one keyboard, and at least one microphone; and (3) a third case capable of storing a power supply, a video switcher, an audio mixer, one or more encoder computers, and a vertical panel secured adjacent a back side of said third case, said vertical panel comprising a plurality of ports for receiving connectors from cables attached to each of said one or more cameras, said two or more monitors, said at least one keyboard, and said one or more microphones, wherein said power supply is coupled to said vertical panel, said audio mixer, and said one or more encoder computers, said method comprising the steps of:
  removing said at least one video camera, said at least two monitors, said at least one keyboard, and said at least one microphone from said first case and said second case;
  coupling said at least one video camera, said at least two monitors, said at least one keyboard, and said at least one microphone to said vertical panel of said third case, said step of coupling comprising coupling a cable between each of said at least one video camera, said at least two monitors, said at least one keyboard, and said at least one microphone and a respective port on said vertical panel; and
  providing power to said power supply,
  wherein each respective port for receiving a signal from said at least one camera is pre-wired to said video switcher, each respective port for receiving a signal from each of said one or more microphones is pre-wired to said audio mixer, and an output of said video switcher and an output of said audio mixer are pre-wired to said one or more encoder computers, wherein said pre-wiring enables a user to set up said equipment without substantial assembly.

* * * * *